UNITED STATES PATENT OFFICE 2,110,473

BISMUTH SALTS OF A MONOALKYL POLY-CARBOXYLATE AND PROCESS OF MAKING THEM

Paul L. Salzberg, Wilmington, Del., assignor to E. I. du Pont de Nemours & Company, Wilmington, Del., a corporation of Delaware No Drawing. Application September 30, 1936, Serial No. 103,457

11 Claims. (Cl. 260—11)

This invention relates to bismuth salts of acid esters of polycarboxylic acids with aliphatic alcohols of at least ten carbon atoms.

This case is a continuation in part of my copending application Serial No. 726,108, filed May 17, 1934.

This invention has as an object the preparation of bismuth salts of acid esters of aliphatic alcohols with polycarboxylic acids. A further object is the preparation of bismuth salts of acid esters of phthalic acid. A still further object is the preparation of oil-soluble bismuth alkyl polycarboxylates. A still further object is the preparation of compositions useful in combating syphilis and other spirochetal diseases. A still further object is the provision of processes whereby these bismuth salts may be prepared. Other objects will appear hereinafter.

These objects are accomplished by the following invention wherein there are prepared bismuth salts of acid esters of polycarboxylic acids with aliphatic alcohols of at least ten carbon atoms, for example, the bismuth salt of monododecyl phthalate.

The neutral salts of bismuth with polycarboxylic acids partially esterified with monohydric aliphatic alcohols of at least ten carbon atoms are preferably prepared by reacting in aqueous or aqueous-alcoholic solution a salt of the acid ester, for example the sodium salt, with an aqueous solution of a bismuth salt preferably containing a water soluble polyhydric alcohol such as mannitol. The bismuth salt of the acid ester precipitates and may be separated from the supernatant liquid by filtration. If desired, the compound so prepared may be further purified by dissolving, for example in an aromatic hydrocarbon, removing the small amount of dissolved water by means of a dehydrating agent, such as anhydrous sodium sulfate, and filtering off the insoluble residue. The bismuth salt of the polycarboxylic acid ester may, if desired, be used in solution or may be isolated, for example, by evaporation of the solvent.

In preparing the bismuth salt of the alkyl polycarboxylates, bismuth oxide or hydroxide is reacted with the acid ester or a bismuth salt is reacted with a salt of the acid ester. Water soluble bismuth salts may in general be employed. For purity of product and convenience in operation the bismuth salt such as the nitrate is preferably dissolved in an aqueous solution of a polyhydric alcohol such as mannitol.

Having outlined the general principle of the invention above, the following applications thereto to certain specific instances are included for purpose of illustration and not in limitation.

EXAMPLE I

*Bismuth tris (monododecyl-phthalate)*

Sixty and two tenths grams (0.15 mol.) of dodecyl acid phthalate was dissolved in 120 grams of alcohol and neutralized with a 17% caustic soda solution using phenol-phthalein as the indicator. A solution of bismuth nitrate was made as follows: Twenty-four and two tenths grams (0.05 mol.) of hydrated bismuth nitrate

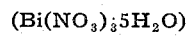

$$(Bi(NO_3)_3 5H_2O)$$

and 9 grams of mannitol were pulverized together and then dissolved in 200 cc. of water. The bismuth nitrate solution was poured slowly into the sodium dodecyl phthalate solution. A sticky viscous oily layer settled out. After stirring for about an hour and allowing to settle, the clear supernatant liquid was decanted. The wet oily layer which weighed 76 grams was dissolved in 60 grams of benzene and dried with anhydrous sodium sulfate. After filtering off the sodium sulfate the clear, pale-yellow solution weighed 110 grams. It analyzed 47.3% total solids and 7.9% of bismuth metal which corresponds to 16.7% bismuth calculated on the solids. The calculated bismuth content of bismuth tris (monododecyl phthalate) is 17.3%. The benzene was removed from a portion of the filtered solution by evaporating to constant weight under a water pump vacuum on a water bath. The residue was a pale-yellow, viscous, sticky liquid. Five tenths grams of this material was readily dissolved in 5 grams of olive oil. The benzene solution showed no sign of separation after storing 7 months.

In preparing the acid ester, the reaction is, in general, carried out by heating the alcohol and the anhydride for a period of at least 30 minutes. A wide range of temperature may be used but a temperature range of 120–150° C. is preferred. This treatment is sufficient to cause the anhydride to react with the hydroxyl group of the alcohol in a relatively short time. The course of the esterification may readily be followed by titration of samples with standard alkali. Thus, in preparing monododecyl phthalate, the theoretical acid number is obtained after heating at 140° C. for one-half hour or at 120° C. for one hour.

The phthalic acid ester is then neutralized in aqueous alcohol solution with sodium or potassium hydroxide or carbonate to obtain the solution of the neutral alkali metal salt which in turn is treated with a water soluble salt of bismuth to obtain by double decomposition the salt desired.

In preparing the acid ester in general, any alcohol of at least ten carbon atoms may be employed including decyl, dodecyl, tetradecyl, cetyl, octadecyl, 9,10-octadecenyl, eicosyl, ricinoleyl, eleostearyl, abietyl, tetradecahydroanthracenyl, myricyl, alpha and beta decahydronaphthyl, undecyl, undecylenyl and naphthenyl alcohols, particularly naphthenyl alcohols of ten to thirteen carbon atoms. Mixtures of alcohols may be employed. While primary fatty alcohols such as are obtained by the carboxyl hydrogenation of vegetable oils, for example, coconut oil or cotton seed oil as disclosed in copending application of W. A. Lazier, Serial No. 445,224, filed April 17, 1930, or in W. A. Lazier U. S. Patent 1,839,974 are preferred, it is to be understood that other alcohols may be used, for example, the alcohols obtained by the hydrogenation of animal oils such as sperm oil, the alcohols obtained by hydrating olefines produced by the cracking of paraffin wax or the higher alcohols produced in the catalytic hydrogenation of carbon monoxide. These latter include a large number of high molecular weight branched chain alcohols, some of which are used in the process of the present invention, e. g., those of at least ten carbons.

In preparing the acid ester of the polycarboxylic acid, it is particularly desirable, because of convenience of operation, etc., to use the anhydride of the polycarboxylic acid where this is possible. This allows a more ready formation of acid esters and minimizes the formation of neutral esters. The term "polycarboxylic acid" in the claims is therefore to be understood as including the anhydrides thereof. It is, however, possible to make the compounds by processes in which the acid is itself used. Similarly, the acid esters may be made by the use of the acid chloride with an excess of the particular alcohol or may even be made from the neutral ester and alcohol and an ester interchange catalyst. The phthalic anhydride may be replaced by other carboxylic acids or anhydrides such as succinic, malic, maleic, fumaric, adipic, citric, camphoric, hexahydrophthalic, trimesic and quinolinic. Those dicarboxylic acids are preferred in which the carboxyl groups are attached to adjacent carbon atoms, such as phthalic acid, succinic acid or maleic acid. These acids as a class possess two unique advantages over other dibasic acids. First, by virtue of their ability to form cyclic anhydrides they lend themselves readily to the preferred process of producing the monoesters, namely by heating the anhydrides with substantially equivalent quantities of the alcohols. This reaction forms the monoester with no substantial by-products, whereas the direct esterification of a dicarboxylic acid which does not readily form an anhydride results in a mixture of monoester with the di-ester as well as unchanged acid. The presence of these impurities is a source of considerable difficulty in obtaining pharmaceutically valuable products. A second advantage of 1,2-dicarboxylic acids is the uniquely superior organic solubility of the resulting ester-salts. While I do not wish to be limited by theory, it is my belief that these preferred ester-salts exist as chelater compounds. In the case of oxy-bismuth dodecyl phathalate, the chelate nature of the compound is represented by the structure

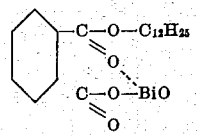

where the dotted line represents a coordination valency between the metal and the ester group, and completes a cyclic structure. By virtue of this cyclic structure, the product loses its salt-like character as is evidenced by low melting-point and high organic solubility. The further the carboxyl and the ester groups are removed from one another, the more difficult becomes chelate ring-formation. Even the 1,2-dicarboxylic acid esters necessitate the rather unusual 7-membered ring in order to form chelates, and the dicarboxylic acids in which the carboxyl groups are separated by more than two carbon atoms form monoesters with practically no tendency to chelate with metals.

Basic bismuth compounds of monoalkylphthalates may also be prepared as above indicated, e. g., by heating bismuth oxide with monododecyl phthalate on a water bath. Oxy-bismuth-dodecyl phthalate of 37.5%, bismuth content, and oxy-bismuth-octadecyl phthalate of 32.6%, bismuth content, may thus be prepared.

The compounds of the type herein disclosed are soluble in many organic solvents, for example, ethyl acetate, butyl acetate, butyl alcohol, and toluene. They offer therefore an advantageous method of incorporating bismuth with organic materials.

Bismuth compounds of alkyl phthalates of at least ten carbon atoms have been found to be useful for pharmaceutical purposes and particularly in the treatment of spirochetal infections, for example, syphilis. Their low toxicity and high therapeutic effect combined with their solubility in oils, for example, olive oil renders them particularly suitable for this purpose. Oil solubility is of paramount importance in applying these therapeutics by injection. The compounds of this invention are uniquely valuable in this respect.

The above description and examples are intended to be illustrative only. Any modification of or variation therefrom which conforms to the spirit of the invention is intended to be included within the scope of the claims.

I claim:
1. Bismuth tris (monododecyl phthalate).
2. A bismuth salt of monododecyl phthalate.
3. A bismuth salt of a monoalkyl phthalate, the alkyl group containing from ten to thirty-one carbon atoms.
4. A normal bismuth salt of a monoalky phthalate, the alkyl group containing from ten to thirty-one carbon atoms.
5. A bismuth salt of a monoalkyl ester of a dicarboxylic acid, the alkyl group containing from ten to thirty-one carbon atoms and the carboxyls of the acid being on adjacent carbon atoms.
6. A normal bismuth salt of a monoalkyl ester of a dicarboxylic acid, the alkyl group containing from ten to thirty-one carbon atoms and the carboxyls of the acid being on adjacent carbon atoms.
7. A bismuth salt of an acid ester of a polycarboxylic acid with an alcohol containing from ten to thirty-one carbon atoms.

8. In a process of preparing bismuth salts of acid esters of polycarboxylic acids the step which comprises reacting a solution of bismuth nitrate in aqueous mannitol with an aqueous alcoholic solution of sodium dodecyl phthalate.

9. In a process of preparing bismuth salts of acid esters of polycarboxylic acids the step which comprises reacting an aqueous solution of bismuth nitrate containing mannitol with an aqueous alcoholic solution of a sodium salt of an acid ester of phthalic acid with an aliphatic alcohol containing from ten to thirty-one carbon atoms.

10. In a process of preparing bismuth salts of acid esters of polycarboxylic acids the step which comprises reacting an aqueous solution of bismuth nitrate containing mannitol with an equeous alcoholic solution of an alkali metal salt of an acid ester of a polycarboxylic acid with an aliphatic alcohol containing from ten to thirty-one carbon atoms.

11. In a process of preparing bismuth salts of acid esters of polycarboxylic acids the step which comprises reacting bismuth ion in aqueous solution with an aqueous solution of a salt of an acid ester of a polycarboxylic acid with an alcohol containing from ten to thirty-one carbon atoms.

PAUL L. SALZBERG.

CERTIFICATE OF CORRECTION.

Patent No. 2,110,473.                                March 8, 1938.

PAUL L. SALZBERG.

It is hereby certified that error appears in the printed specification of the above numbered patent requiring correction as follows: Page 2, first column, line 75, for "chelater" read chelated; and second column, line 1, for "phathalate" read phthalate; line 60, claim 4, for "monoalky" read monoalkyl; page 3, second column, line 3, claim 10, for "equeous" read aqueous; and that the said Letters Patent should be read with these corrections therein that the same may conform to the record of the case in the Patent Office.

Signed and sealed this 26th day of April, A. D. 1938.

(Seal)                                                    Henry Van Arsdale,
                                                         Acting Commissioner of Patents.